March 7, 1939. F. M. KANNENSTINE 2,149,442
GALVANOMETER
Filed June 11, 1937 3 Sheets-Sheet 1
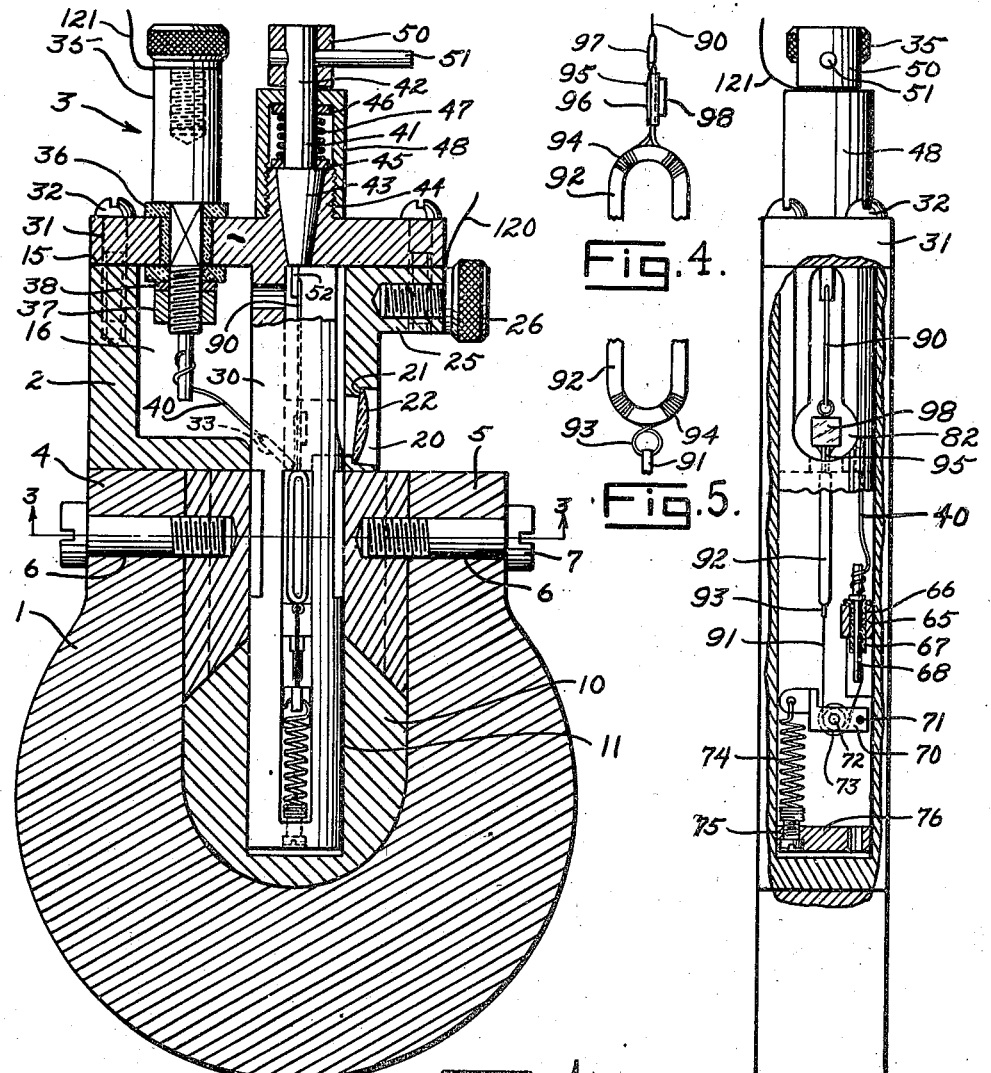
INSERTS OF HIGH MAGNETIC PERMEABILITY
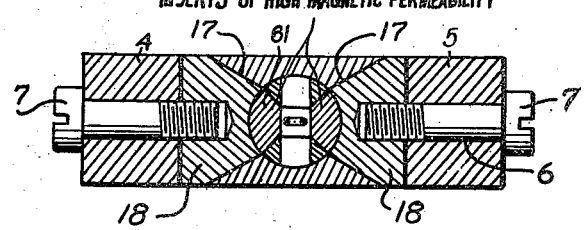
Inventor
F. M. KANNENSTINE.
Jesse R. Stone
Lester D. Clark
By
Attorneys March 7, 1939.  F. M. KANNENSTINE  2,149,442
GALVANOMETER
Filed June 11, 1937  3 Sheets-Sheet 2

Inventor
F. M. KANNENSTINE
By Jesse R. Stone
Lester B. Clark
Attorneys

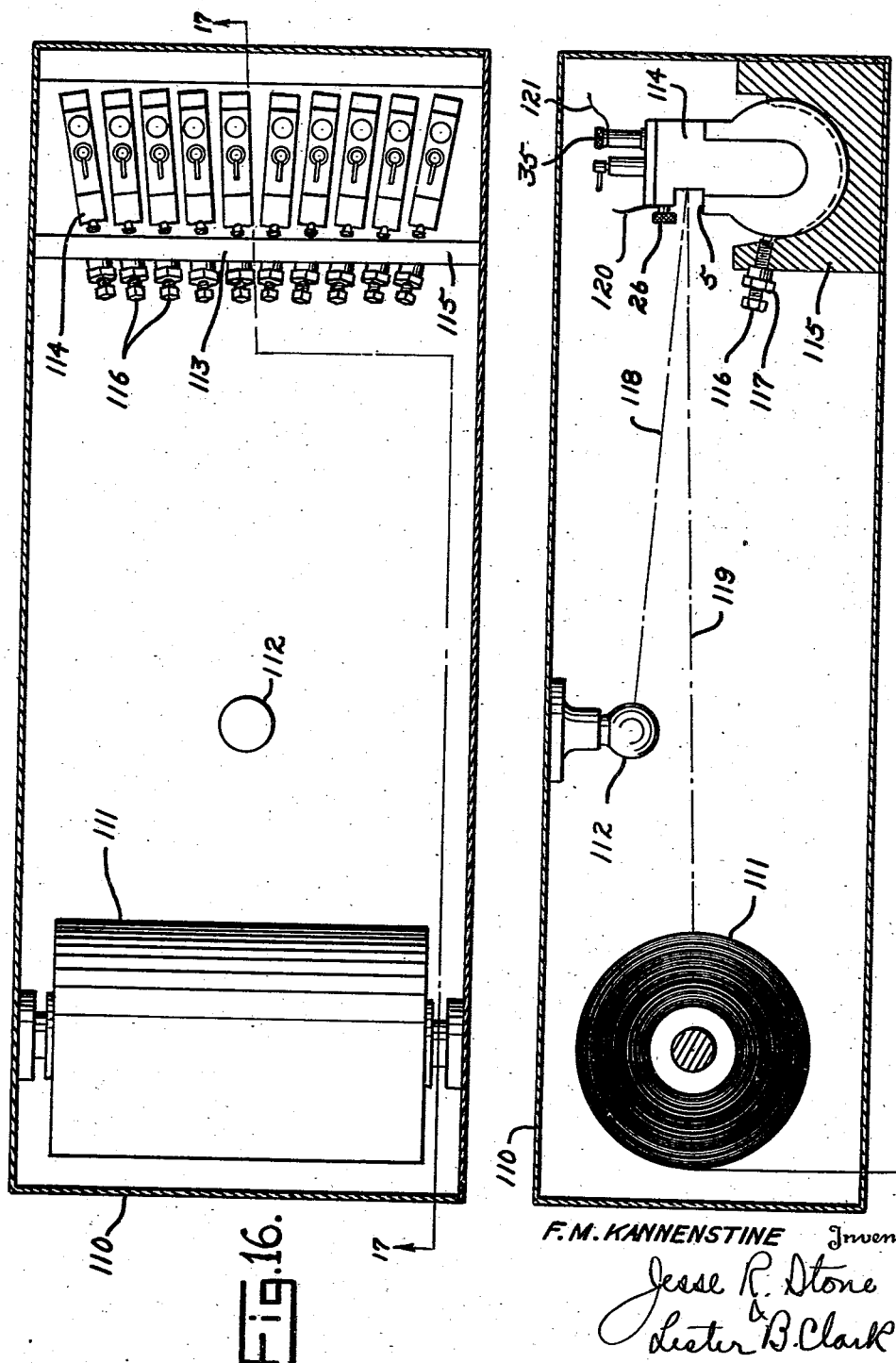

Patented Mar. 7, 1939

2,149,442

UNITED STATES PATENT OFFICE 2,149,442

GALVANOMETER

Fabian M. Kannenstine, Houston, Tex.

Application June 11, 1937, Serial No. 147,642

5 Claims. (Cl. 171—95)

The invention relates to oscillographs and more particularly to the current responsive element thereof which comprises the reflection type of galvanometer having a movable loop which oscillates in accordance with the amplitude and frequency of a flow of current.

It is an object of the invention to provide a current responsive instrument having relatively small transverse dimensions whereby a plurality may be in juxtaposed position and occupy a minimum of space.

It is also an object to provide an oscillograph having a plurality of current responsive galvanometers of a relatively small transverse dimension whereby a plurality of such instruments may be used in juxtaposed relation without producing a desensitizing effect of one upon the other.

A further object is to provide a current responsive instrument of the reflection type in which light from the mirror mounted upon the moving system is reflected substantially at right angles to the transverse dimension and to the magnetic lines of force through the air gap.

A further object is to provide a reflection type of instrument having a removable suspension system which is immersed in a damping fluid contained within a chamber including the air gap of the magnetic circuit.

A more specific object is to provide an instrument of the reflecting type having a housing in the magnet to receive the suspension system of the instrument.

A further specific object is to provide a reflection type of current responsive instrument having a housing within the magnet in which inserts of high permeability are embedded whereby a small air gap is obtained and there is a high flux density through the moving system.

Still another object is to provide a current responsive instrument which adapts itself to efficient use in groups to record a plurality of wave traces in closely juxtaposed relation on a single recording strip as is desired, for example, in recording impulses in the seismic method of geophysical prospecting.

Other and further objects will be apparent from the following description taken in connection with the drawings in which:

Fig. 1 is a sectional view of a galvanometer embodying the invention.

Fig. 2 is a front elevation taken from the right of Fig. 1 and showing parts in section.

Fig. 3 is a sectional view on line 3—3 of Fig. 1.

Figs. 4 and 5 are enlarged views illustrating the construction of the upper and lower ends, respectively, of the moving coil.

Fig. 16 is a plan view partly in section of an oscillograph system constructed in accordance with the invention.

Fig. 17 is a side elevation taken on line 17—17 of Fig. 16.

Figure 6:
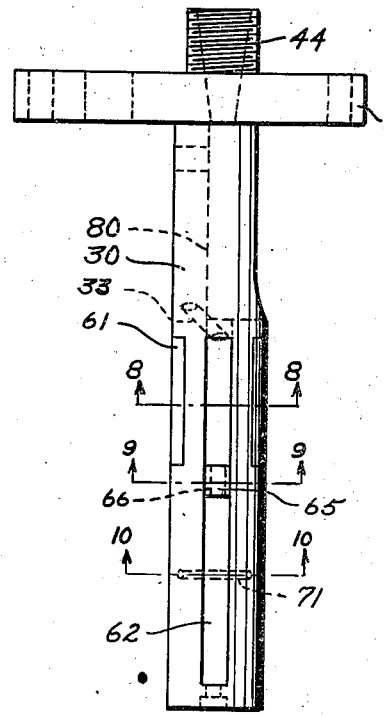
Fig. 6 is an elevational view of the stem for supporting the moving system.
Figure 7:
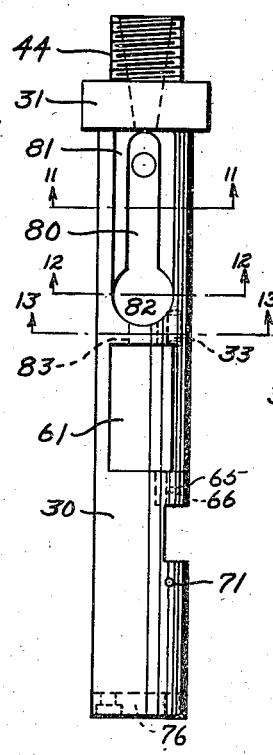
Fig. 7 is similar to Fig. 6 but taken at right angles thereto.
Figure 11:
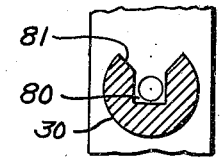
Figs. 8 to 13 are sectional views of the stem shown in Figs. 6 and 7 and taken respectively on lines 8—8 to 13—13 of those figures.
Figure 12:
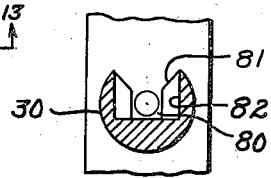
Figure 13:
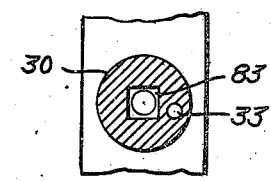
Figure 8:
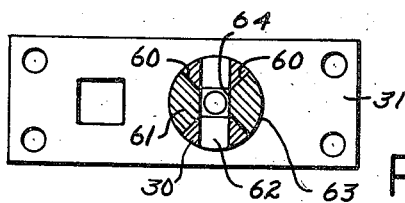
Figure 9:
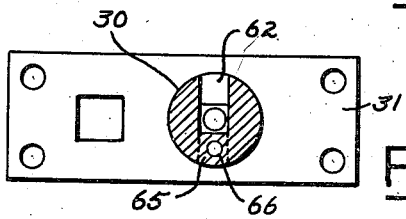

An instrument involving the invention is illustrated in Figs. 16 and 17 in which an oscillograph cabinet 110 encloses a recording strip 111, a light source 112, and a galvanometer generally designated as 113, and comprising a plurality of current responsive elements or galvanometers 114 which will be more fully described. The galvanometer 114 is adjustably and removably secured in a mounting block 115 by set screws 116. As already indicated, and as will be more fully described, the galvanometer 114 is of the reflection type in which a mirror is mounted upon the moving system and a beam of light 118 is directed upon the mirror 98 for reflection upon a screen or a recording tape 111, whereby the movements of the mirror may be observed or recorded. Current is conducted to terminals 26 and 35 of galvanometer 114 through conductors 120 and 121, respectively, whereby an actuating current is conducted through the instrument.

With the assembly just described, it is understood that a beam of light 118 falls upon the moving mirror 98 within the galvanometer 114 and is reflected at 119 upon the recording strip 111 to produce a record of the frequency and amplitude of the currents through the galvanometer.

The construction and operation of the galvanometers 114 of the galvanometer bank 113 are best illustrated in Figs. 1 to 15. Each of these instruments comprises essentially a magnet 1, a housing 2, and a suspension system generally designated as 3.

Figures 14, 15:
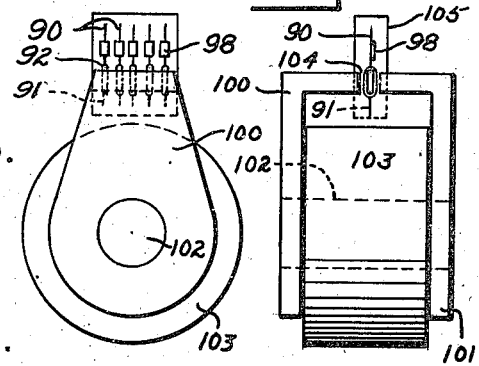
Figs. 14 and 15 are views illustrating a modified form of the invention.
Figure 10:
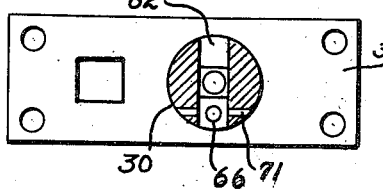

Magnet 1 may comprise an electromagnet as illustrated in the embodiment shown in Figs. 14 and 15, or preferably, may be a permanent magnet of the horse shoe type as illustrated in Fig. 1. In either event the magnet comprises spaced poles 4 and 5, each having a central bore 6 to receive screws 7 for a purpose that will be made apparent.

The housing 2 is made up of non-magnetic material, preferably metal, and has the same transverse dimension as does magnet 1. Downwardly extending portion 10 of this housing has a tubular bore 11 to receive the lower end of the suspension element hereafter described. The upper portion of the housing provides a mounting surface 15 for the suspension assembly and has an elongated cavity 16 which is an enlargement of bore 11 to likewise receive parts of the suspension element.

An important feature of the invention is the provision of tapered slots 17, see Fig. 3, in the walls of the housing 2 adjacent poles 4 and 5 of the magnet. Positioned within these slots are high permeability inserts 18 which are fixed to the housing as by soldering. These inserts are drilled and tapped to receive the threaded ends of machine screws 7, and in this manner the surfaces of the inserts 18 and poles 4 and 5 are brought into intimate relation and the magnet and housing are formed into a composite unit.

In the front wall of the housing 2 above pole piece 5 is provided an opening 20 having a shoulder 21 against which is positioned a window 22, which may have a condensing lens as illustrated, and which is fixed within the opening as by a suitable cement. This window serves to admit light to the mirror of the moving system and also to permit the reflected light to pass outwardly from the housing. At the same time the window 22 serves as a fluid tight closure to retain a damping fluid within the housing. Above window 22 is a flange 25 on housing 2. A drilled bore in this flange receives binding post 26 which serves as one terminal on the instrument.

The suspension system includes a stem which comprises a tubular body portion 30 which extends downwardly within bore 11 in housing 2. Flange 31 extends outwardly from the stem body 30 and is carefully machined to fit upon surface 15 of housing 2. Machine screws 32 secure the stem and housing in fixed relation. If desired a gasket may be used between flange 31 and housing 2 to insure a liquid tight seal between the housing and stem.

Binding post 35 passes through an insulating bushing 36 in an opening in flange 31 and is secured in place by means of a nut 37 and a washer 38. The end of the binding post 35 extends downwardly within cavity 16 to provide a connection with a wire 40 from the vibrating element whereby binding post 35 serves as the other terminal of the instrument.

An upper suspension support 41 comprises a cylindrical stem 42 and a downwardly tapering end portion 43 which fits within a tapered opening in a boss 44 extending upwardly from flange 31. Washers 45 and 46 and an interposed spring 47 are placed upon stem 42, the spring being held in tension by means of cap 48 which is threadably attached to boss 44. As the tapered end 43 of the support presents a shoulder against which the washer 45 is urged by spring 47, close sealing engagement is maintained between the suspension support and the stem. In order to provide for rotation of support member 41 to adjust the instrument a collar 50 and stem 42 are drilled for a press fit with pin 51. This construction holds the parts in assembled relation and obviously the pin 51 may be used as a handle for rotational adjustment of the suspension support 41. A projection 52 on the lower end of the suspension support is adapted to have a suspension ribbon 90 soldered thereto.

The construction of the stem 30 is such that the galvanometer element, which comprises the suspension ribbons and the moving element of the instrument, may be axially suspended therein and passed through the magnetic flux in the gap between inserts 18 and housing 2. In order to further reduce the air gap and decrease the reluctance of the magnetic circuit the opposite sides of the stem 30 are provided with tapered recesses at 60 (see Fig. 8), and high permeability inserts 61 are fixed therein, preferably by means of hard solder. A slot 62 extends transversely of the stem 30 throughout the extent of inserts 61, the inner faces 64 of the inserts being co-planar with the walls of the slot.

In a similar manner outer surfaces 63 of inserts 61 coincide with the cylindrical outer surface of stem 30.

At the upper end of slot 62 a bushed opening passes diagonally upward through stem 30 to provide a passageway for conductor 40, which is electrically connected to binding post 35 and to an anchor pin 68.

Below inserts 61 slot 62 extends but partially through stem 30, leaving a ledge 65 which is drilled at 66 to receive an insulating bushing 67 through which the anchor pin 68 passes. This pin is provided with a shoulder near its upper end to fix the position of the pin within bushing 67. Within slot 62 below anchor pin 68 is a tensioning arm 70 pivoted on a pin in opening 71 which extends transversely of the slot. The pivoted end of arm 70 is bifurcated and has rotatably mounted therein and upon pin 72 an ivory roller 73 about which the lower suspension ribbon is adapted to pass. The end of arm 70 opposite the pivot pin in opening 71 is attached to a tension spring 74, the lower end of which is adapted to threadably engage adjusting screw 75 passing through an opening in the bottom wall 76 at the lower end of slot 62.

By means of this construction it is obvious that arm 70 may be resiliently and adjustably urged downwardly to place tension upon the suspension system hereinafter described.

Above inserts 61 the stem 30 is channeled at right angles to slot 62 as is best illustrated in Figs. 7 and 11 to 13. A longitudinal groove 80 of sufficient depth to permit axial suspension of the galvanometer element has flared outer walls 81 and terminates at its lower end in a cylindrical bore 82. This construction enhances accessibility to the upper end of the suspension system, bore 82 also serving as the chamber within which the galvanometer mirror is positioned adjacent window 22. Slot 62 and groove 80 are in longitudinally spaced relation and a square axial bore therebetween is shown at 83.

The galvanometer element comprises upper and lower ribbon suspensions 90 and 91 connected to galvanometer coil 92 shown in detail in Figs. 4 and 5. This elongated coil comprises a plurality of turns of insulated wire and is suspended in closely spaced relation with walls of the axial bore of stem 30. One end of the wire forming coil 92 terminates at the lower end of the coil (Fig. 5) in a loop 93, the wire adjacent the loop being neatly bound in a composite mass by binding thread or fiber 94. The other end of the wire of coil 92 is formed with a similar loop 97 at the opposite end of the coil but at right angles to the lower loop and is spaced from the upper end of the coil by an extension 95 of the wire.

Here again the coil turns and the wire adjacent the loop are bound together by a binding thread or fiber 94.

Upon extension 95 is placed a covering 96, such as paper, and the coil unit is then covered with a suitable coating such as shellac. Insulation is then removed from a portion of loops 93 and 97, suspension ribbons 90 and 91 are soldered thereto, and mirror 98 is mounted upon extension 95 to complete the galvanometer suspension. By means of this construction it is apparent that the reflecting surface of mirror 98 is at right angles to the magnetic flux in the air gap and is sensibly parallel to the longitudinal axis of the coil.

Suspension ribbon 90 is soldered to projection 52 on suspension support 41 in such a manner that mirror 98 is within bore 82 adjacent window 22. Lower suspension ribbon 91 is then passed beneath roller 73, the end thereof being brought upwardly and soldered to anchor pin 68. A circuit is thus completed from binding post 26 and suspension support 41 to and through the vibrating element to anchor pin 67, which, as above described, is electrically connected to binding post 35 through insulated wire 40.

Tension is applied to the vibrating system by means of adjustment of screw 75 in spring 74, while proper angular orientation of the coil relative to the magnetic lines of force within the air gap is effected by means of pin 51 and suspension support 41.

Before installation of the suspension assembly in housing 2 a suitable fluid, as for example a suitable mineral oil, is poured into the chamber in the housing to serve as a damping agent for the vibrating system to substantially eliminate the natural period thereof.

The modification illustrated in Figs. 14 and 15 comprises end plates 100 and 101, joined by core 102 to form a spool for coil 103 whereby an electromagnet is formed. End plates 100 and 101 are provided with flanged pole pieces to provide an elongated air gap 104 in which a plurality of galvanometer elements are supported within a housing generally designated as 105. The construction of this embodiment is otherwise in accordance with the general details as above set forth in connection with the embodiment illustrated in Figs. 1 to 13.

The operation of the above described device is believed obvious. Electrical impulses of which a wave trace is to be recorded are conducted to the instrument through conductors 120 and 121 connected to terminals 26 and 35 of the galvanometer 114. Current thus flows from terminal 35 through conductor 40 to support 68, thence through the suspension system, comprising ribbon suspensions 90, 91 and coil 92, to the instrument frame and the terminal 26. Current through the coil 92 causes the coil to be deflected from its normal position by an amount depending upon the strength of the current. Since this current is varying, the coil 92 and its associated mirror 98 oscillate in response to the strength and frequency of the actuating current. The ray of light 118 from the lamp 112 passes through window 22 to mirror 98 and is reflected at 119 to sensitized recording tape 111 to produce a trace which represents the frequency and amplitude of the initiating impulses. It is understood that the operation as above described applies to each of the galvanometers of the galvanometer bank 113 and that the galvanometers are so adjusted that a plurality of wave traces are recorded upon sensitized tape 111 in parallel relation.

From the foregoing it will be apparent that the invention provides an oscillograph which includes a galvanometer having a small transverse dimension whereby a plurality of such galvanometers may be arranged in side by side relationship to form a compact and efficient galvanometer bank. At the same time the galvanometer is so constructed that the mirror on the suspension system is positioned above the pole pieces of the magnet and at, or substantially at, right angles to both the minimum dimension of the instrument and the magnetic lines of force in the air gap whereby the necessity of providing openings in the pole pieces to accommodate the passage of the light beam is obviated.

While the preferred embodiment of the invention is described in detail, it is to be understood that the invention is not confined thereto but is intended to include equivalent constructions which come within the spirit of the invention.

What is claimed as new is:

1. A current responsive instrument comprising a substantially U-shaped magnet having spaced pole pieces, a housing positioned between said pole pieces, magnetic inserts embedded in the opposite walls of the housing adjacent said pole pieces to form an air gap in the plane of the magnet, a galvanometer element suspended between said inserts and within said housing, and means outside the air gap and movable with said galvanometer element for indicating displacement of the element within said magnetic field.

2. A current responsive instrument comprising means for producing a magnetic field, said means having an air gap in the magnetic path thereof, means forming a hollow chamber including said air gap, a galvanometer element suspended in said chamber, and means mounted on the galvanometer element outside the air gap and movable with the element for indicating displacement of the element within said magnetic field.

3. A current responsive instrument comprising a magnet having spaced pole pieces, a non-magnetic housing about the pole pieces and forming therewith a fluid chamber, and a galvanometer element suspended in said chamber, said element having mounted thereon outside the air gap a vertically disposed mirror having its reflecting surface substantially perpendicular to the magnetic flux between said pole pieces.

4. In an oscillograph, a galvanometer assembly comprising an elongated stem having an axial passageway therein, magnetic inserts in the opposite walls of said stem, a vibratory system suspended in said stem under tension, and means for conducting current through said vibratory system, said vibratory system having a mirror thereon in spaced relation with the magnetic inserts to reflect light substantially in the direction of the magnetic flux between the inserts.

5. A current responsive instrument comprising a substantially U-shaped magnet, a non-magnetic housing within the magnet and extending outwardly beyond the poles thereof, a window in the housing adjacent the end of the magnet and transversely of the flux between the magnet poles, a stem slidable within said housing and adapted to cover the housing and enclose a damping fluid therein, said stem having a galvanometer element therein, and a mirror on said element adjacent the window to reflect light substantially in the direction of the magnetic flux.

FABIAN M. KANNENSTINE.